US006442284B1

(12) United States Patent
Gustafson et al.

(10) Patent No.: US 6,442,284 B1
(45) Date of Patent: Aug. 27, 2002

(54) WATERMARK DETECTION UTILIZING REGIONS WITH HIGHER PROBABILITY OF SUCCESS

(75) Inventors: Ammon Gustafson, Beaverton; Geoffrey Rhoads, West Linn; Adnan V. Alattar, Hillsboro; Ravi K. Sharma, Beaverton; Clay Davidson, Lake Oswego, all of OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/302,663

(22) Filed: Apr. 30, 1999

Related U.S. Application Data
(60) Provisional application No. 60/125,349, filed on Mar. 19, 1999.

(51) Int. Cl.[7] .................................................. G06K 9/00
(52) U.S. Cl. ...................................... 382/100; 713/176
(58) Field of Search ................................. 382/100, 232; 380/210, 287, 252, 54; 713/176, 179; 348/461, 463

(56) References Cited

U.S. PATENT DOCUMENTS

| | | | |
|---|---|---|---|
| 5,915,027 A | * 6/1999 | Cox et al. ..................... | 380/54 |
| 6,122,403 A | 9/2000 | Rhoads | |
| 6,154,571 A | * 11/2000 | Cox et al. .................... | 382/250 |
| 6,175,627 B1 | 1/2001 | Petrovic et al. | |
| 6,185,312 B1 | 2/2001 | Nakamura et al. | |
| 6,209,094 B1 | 3/2001 | Levine et al. | |
| 6,222,932 B1 | 4/2001 | Rao et al. | |

OTHER PUBLICATIONS

Avcibas, et al., "Steganalysis of Watermarking Techniques Using Image Quality Metrics", Proceedings of SPIE, Jan. 2001, vol. 4314, pp. 523–531.

U.S. application No. 60/125,349, Rhoads, filed Mar. 19, 1999.

(List continued on next page.)

*Primary Examiner*—Leo Boudreau
*Assistant Examiner*—Abolfazl Tabatabai
(74) *Attorney, Agent, or Firm*—Steven W. Stewart; Digimarc Corporation

(57) ABSTRACT

The present invention detects the presence of a watermark in an image by using a multi-step process. First, the image is examined to determine which regions of the image have characteristics such that there is a high probability that a watermark signal can be detected in that region of the image. Next the regions that have a high probability that a watermark can be detected (in contrast to all regions of the image) are examined to find watermark data. In order to determine the probability of finding watermark data in a particular region of an image, the amount of "variance" in the intensity of the pixels in the region is first examined. For example a region that is entirely white or entirely black has zero variance in luminance. Such a region can not carry watermark data, hence regions with zero or low variance can be eliminated from further processing. Furthermore, if a high variance in a region is a result of the fact that the region has an abrupt border or edge between two highly contrasting regions, the high variance does not indicate a high probability that a watermark signal will be detected in the region. Therefore, after regions with high variance are located, these regions are next examined to look for regions with high edginess spread. Finally, regions with the high variance and high edginess spread are selected for further processing to detect watermark data. For those regions selected for further processing, the detection process can be enhanced by filtering the data with a two step process to increase the signal to noise ratio of the watermark signal. First a high pass filter (e.g. a Laplacian operator) is applied to each region. This filtering operation in effect established a new intensity value for each pixel in the region. Next a nonlinear operator (e.g. a signum function) is applied to the output from the first filter operation. The resulting data is examined to detect watermark data.

20 Claims, 6 Drawing Sheets

OTHER PUBLICATIONS

U.S. application No. 09/074,034, Rhoads, filed May 6, 1998.
U.S. application No. 09/503,881, Rhoads et al., filed Feb. 14, 2000.
U.S. application No. 09/553,084, Reed et al., filed Apr. 19, 2000.
U.S. application No. 09/945,244, Sharma et al., filed Aug. 31, 2001.
Hernandez et al., "Statistical Analysis of Watermarking Schemes for Copyright Protection of Images," *Proceedings of theIEEE*, vol. 87, No. 7, Jul. 1999.

* cited by examiner

WATERMARK DETECTION UTILIZING REGIONS WITH HIGHER PROBABILITY OF SUCCESS

RELATED APPLICATION

This application claims the benefit of U.S. Provisional Application No. 60/125,349, filed Mar. 19, 1999.

FILED OF THE INVENTION

The present invention relates to steganography and more particularly to the detection of digital watermarks in images.

BACKGROUND OF THE INVENTION

The technology for embedding digital watermarks in images is well known. Likewise, the technology for detecting and reading the data payload carried by digital watermarks is well known. Commercial systems are available for performing such operations.

Many watermarking systems redundantly embed the same watermark data in multiple regions of an image. Often watermarking systems embed data in images in a perceptually adaptive manner. That is, the amount of watermark signal in each region of an image is adjusted in accordance with the characteristics of the image in the particular region. The purpose of so adjusting the watermark signal is to insure that the watermark signal will not be visible to an ordinary viewer of the image. Since the strength of the watermark signal varies from region to region, the signal is more easily detected in some regions of an image than in other regions of the image.

Systems for detecting watermarks generally sequentially examine the various regions of an image, seeking to detect the watermark. The amount of computational resources available is generally limited and if a watermark is not detected in a region as a result of applying a certain amount of computational effort, the detection operation moves on to the next region of the image and the process is repeated.

SUMMARY OF THE INVENTION

The present invention detects the presence of a watermark in an image by using a multi-step process. First, the image is examined to determine which regions of the image have characteristics such that there is a high probability that a watermark signal can be detected in that region of the image. Next the regions that have a high probability that a watermark can be detected (in contrast to all regions of the image) are examined to find watermark data. In order to determine the probability of finding watermark data in a particular region of an image, the amount of "variance" in the intensity of the pixels in the region is examined. For example a region that is entirely white or entirely black has zero variance. Such a region can not carry watermark data, hence regions with zero or low variance can be eliminated from further processing. Furthermore, if high variance in a region is a result of the fact that the region has an abrupt border or edge between two highly contrasting regions, the high variance does not indicate a high probability that a watermark signal will be detected in the region. Therefore, after regions with high variance are located, these regions are next examined to look for regions with edges between areas of different luminance which are spread over the entire region. The regions with the high variance and with edginess that is spread widely in the region are selected for further processing to detect watermark data.

For those regions selected for further processing, the detection process can be enhanced by filtering the data prior to applying a watermark detection program so as to increase the signal to noise ratio of the watermark signal. First a high pass filter (e.g. a Laplacian operator) is applied to each region. This filtering operation in effect establishes a new intensity value for each pixel in the region. Next a nonlinear operator (e.g. a signum function) is applied to the output from the first filter operation. The resulting data in each region is then processed in a normal manner to detect watermark data.

DETAILED DESCRIPTION OF AN EMBODIMENTS OF THE INVENTION

Digital watermarks are generally inserted into images in a redundant manner. That is, images are divided into regions and the same data is inserted into each region of the image. The ability of a particular region of an image to effectively carry digital watermark data, depends upon the characteristics of the image in the particular region. Different areas in an image may have more or less ability to carry watermark data. For example an area in an image that is entirely white or entirely black will not have the ability to carry watermark data without changing the appearance of the area. Modern watermarking programs use perceptually adaptive techniques when inserting watermark data into an image. The amount of watermark energy inserted into a region is adjusted depending on the characteristics of the region so as to avoid changing the visual appearance of the image. For example, no watermark energy would be applied to an area of an image that is entirely white or entirely black.

Watermark detection programs generally divide an image into regions and then sequentially try to read watermark data from each of the regions in the image. Generally several attempts are made to detect watermark data in each region of an image.

The present invention shortens the time and computational power required to find a watermark in an image by first identifying those regions of the image that have a high probability that a watermark can be detected in the region. Then, the regions with the high probability rather than all regions are examined to locate watermark data.

It is noted that there are a number of different probability values that can be considered in connection with watermark detection. For example, one can consider the probability that data found by a watermark detection program is in fact identical to the data that was inserted by the program that inserted the watermark. The probability discussed herein is different. The probability discussed herein relative to the present invention relates to the probability that a region of an image with certain characteristics can in fact be carrying watermark data.

Figure 1:
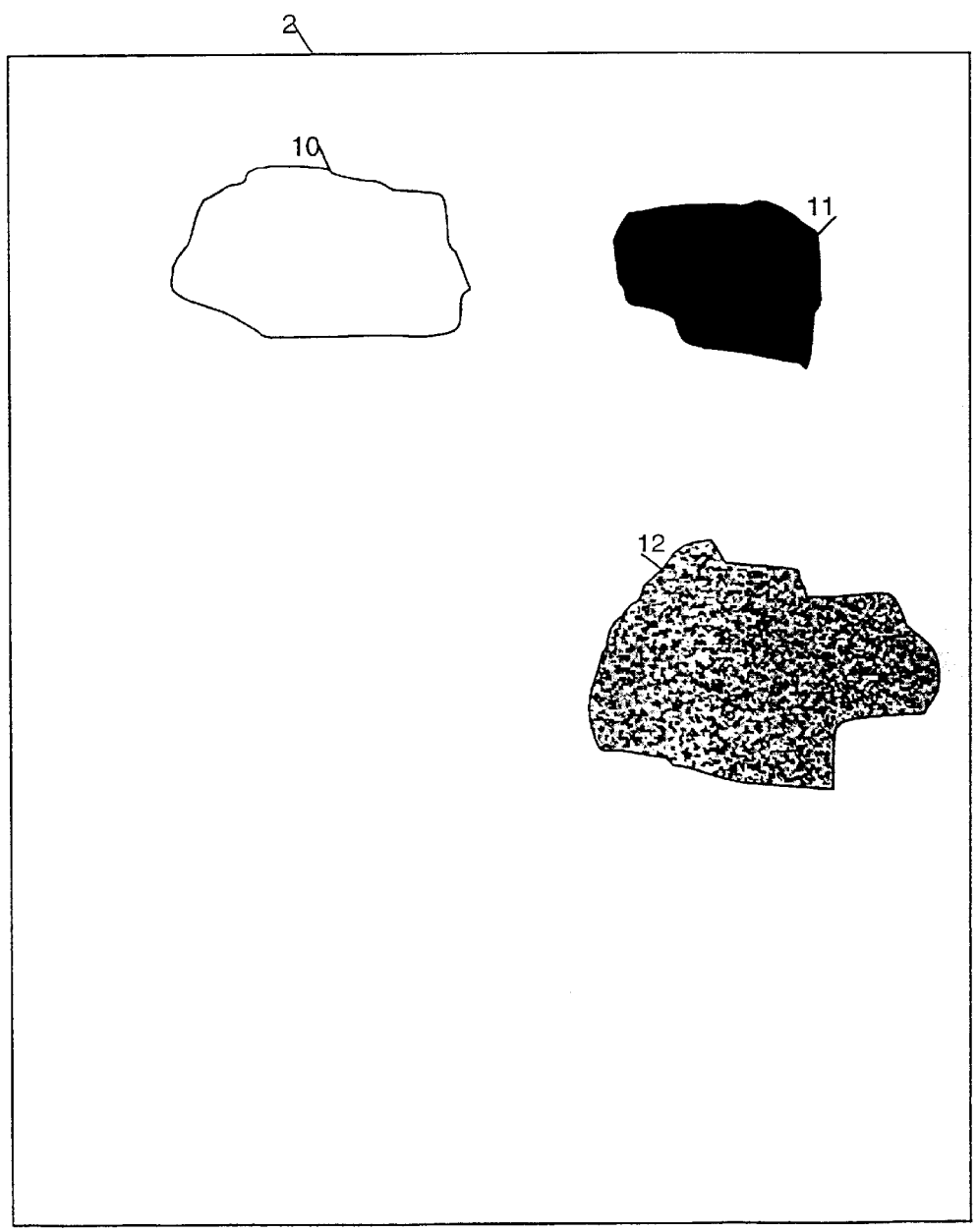
FIG. 1 shows an image with different regions.

FIG. 1 illustrates an image 2 which has a number of different identified regions. Regions with various types of specific characteristics have been shown in order to illustrate the invention. Naturally in most images the regions would not be as pronounced as those shown in FIG. 1 and there would be a variety of types of regions over the entire image 2. The present invention is applicable to any type of image. The special image shown in FIG. 1 is selected only as an example to illustrate the principles of the invention in an easily illustrated manner.

In the image 2 shown in FIG. 1, region 10 is entirely white, regions 11 is entirely black and in region 12, the pixels of the image have a variety of luminance values. If a perceptually adaptive watermarking program is used to insert watermark data in an image such as image 2, no watermark data would be inserted in regions 10, 11. Thus, a program which tried to detect watermark data in regions 10, and 11 would spend time examining these regions, but it would find no watermark data.

Figure 2:
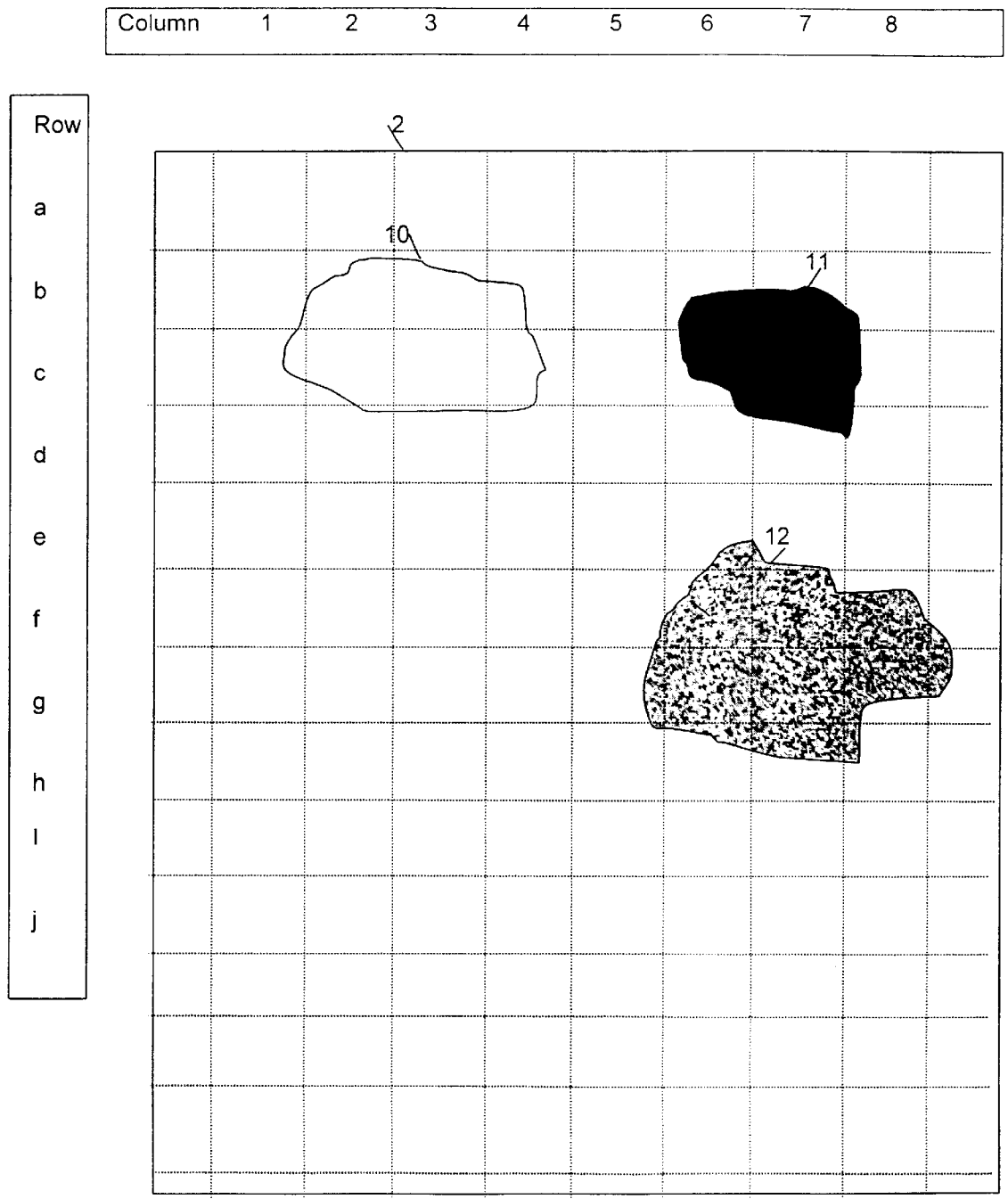
FIG. 2 shows the image divided into regions for processing.

FIG. 2 shows the image 2 divided into regions. In order to detect digital watermark data, a typical watermark detection program would process the regions of an image (such as those regions shown in FIG. 2) in some sequential order. Each region would be examined to determine if watermark data could be detected. Such examination requires a significant amount of time and/or computational resources. In some applications time and/or computational resources are limited.

The present invention provides a way to pre-process or filter an image to determine the regions that are most likely to contain watermark data. The initial processing of each region, that is, the initial filtering, is done very quickly and the regions which have the most probability of yielding watermark data are selected for further processing to actually detect the watermark data. That is, the time consuming watermark detection algorithms are only applied to the regions which have a higher probability of providing watermark data.

Figure 3:
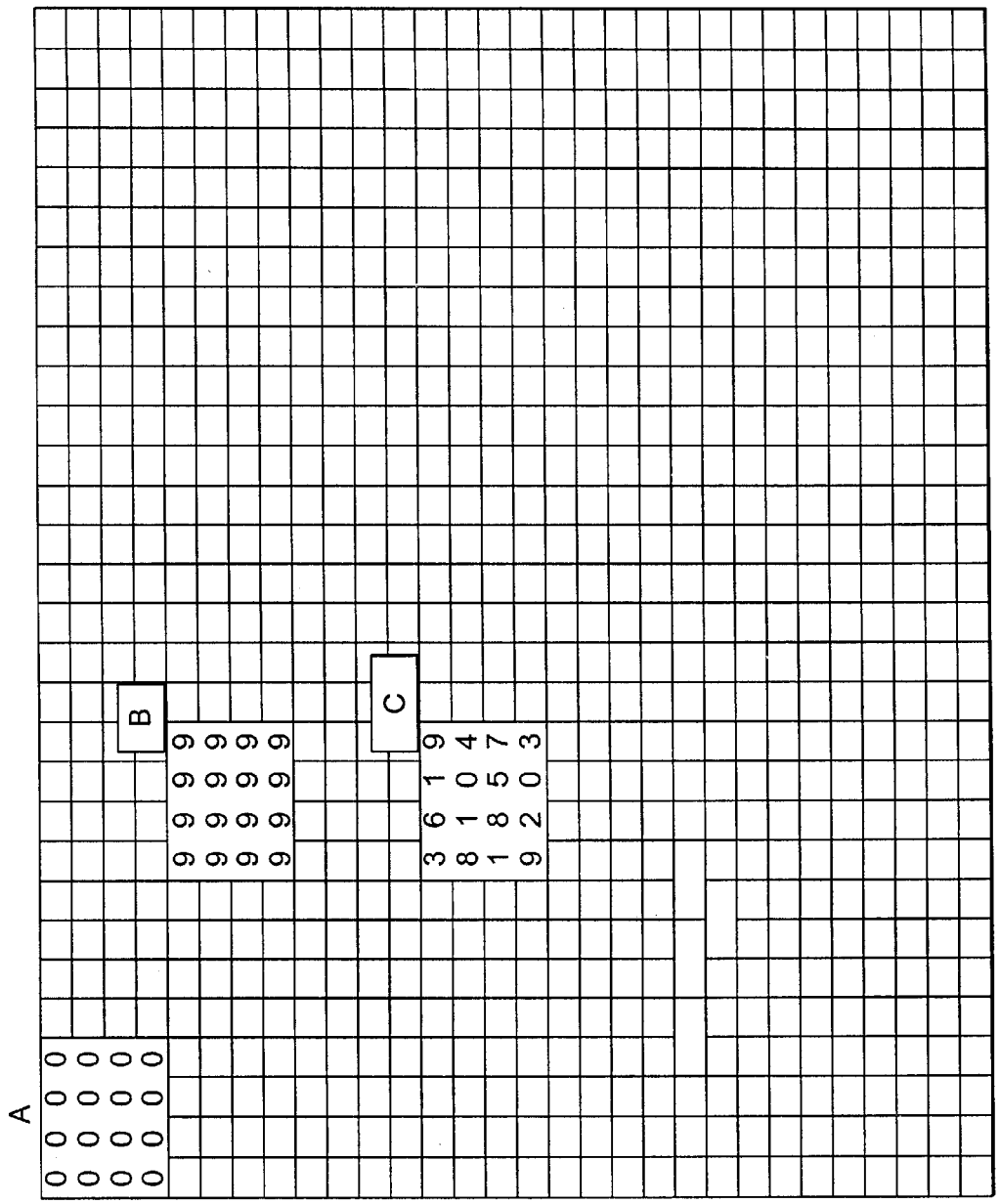
FIG. 3 illustrates the pixels in different regions of an image.

FIG. 3 illustrates pixels in an image. It should be noted that for convenience of illustration, only a limited number of pixels are shown in FIG. 3. Furthermore for convenience of illustration no attempt has been made to make the locations or size of the regions in FIG. 3 correspond to the regions in FIG. 1. In typical applications images are scanned at resolutions higher than 75 pixels per inch (resolutions of 300 600, and 1200 pixels per inch are common) and the regions examined by watermarking programs would generally cover many more pixels than the regions shown in FIG. 3. However, the limited number of pixels shown in FIG. 3 is sufficient to explain the principles of the present invention.

In area A of FIG. 3 all the pixel have a luminance value of zero. This area corresponds to an area such as area row c column 3 in FIG. 2 where the entire region is white. In area B all the pixels have a luminance value of 9. Area B corresponds to an area such as the area in row c column 7 in FIG. 2 where all of the pixels are black. In area C the luminance value varies between 0 and 9. Area C corresponds to an area such as the area in row g column 7 in FIG. 2 where the pixels have a range of luminance. Since the pixels in area A all have a luminance of 0, there is no possibility that this region contains watermark data. Likewise, since all the pixels in region B have a luminance value of 1, there is no possibility that region B contains watermark data. The pixels in region C have a variety of luminance values, hence, there is a possibility that this region does contain watermark data. The present invention is directed to detecting the area of an image where there is sufficient variance in the luminance of the pixels in the region that the region could contain watermark data.

Figure 4:
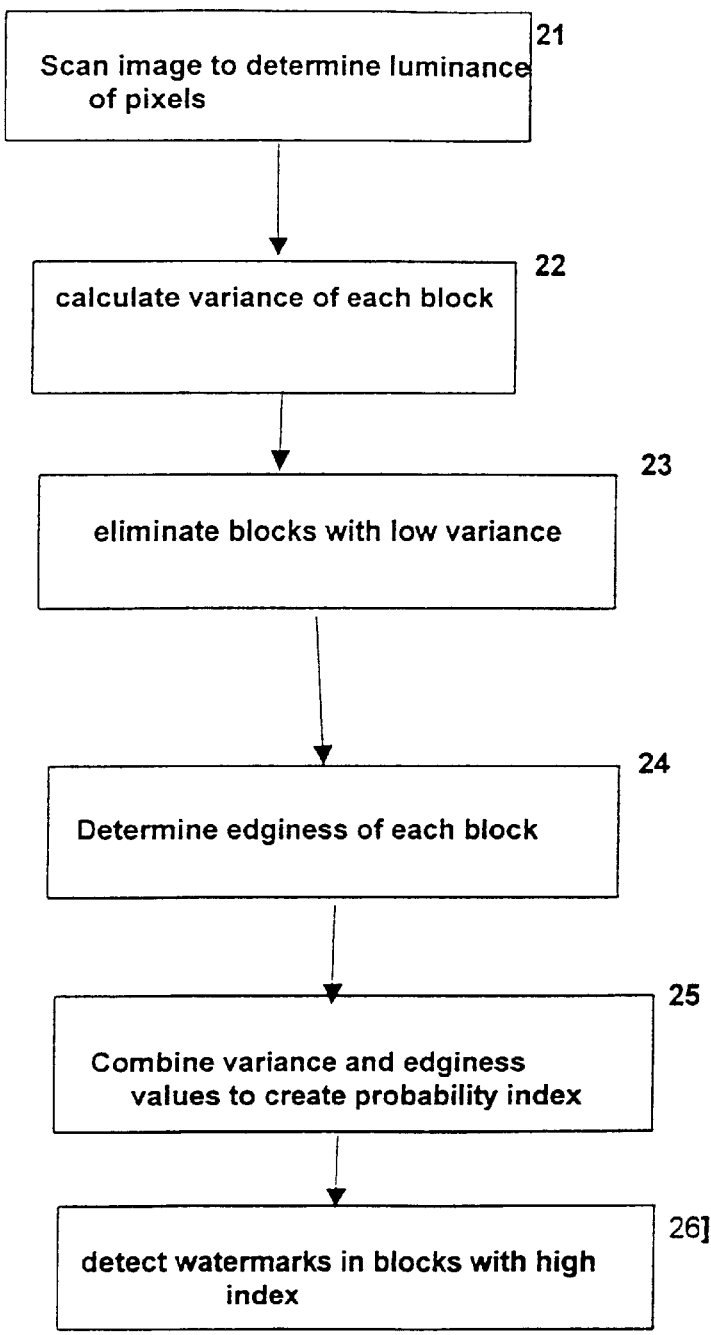
FIG. 4 shows a flow diagram of the steps in the invention.

With the present invention the detection operation proceeds in accordance with the steps shown in FIG. 4. First as indicated by block 21 the image being examined is scanned to detect the luminance of the pixels in the image. Next the pixels are broken into regions. For example each region can be square and have in the order of 10000 to 40000 pixels (that is, in the order of 100 to 200 pixels square). The exact number of pixels in each region depends on the characteristics of the particular detection program used. Next as indicated by block 22, the variance in the luminance of the pixels in each block is calculated. The following formula is used:

$$\text{Variance} = \text{sum}\ ((\text{intensity})^2/(\text{number of pixels})) - (\text{mean intensity})^2$$

If the variance is less than a specified threshold the region is eliminated from further consideration. The threshold value selected will depend upon size of the regions into which the detection program divides the image and upon the characteristics of the watermark as measured over a representative set of images. However, for a typical image with a program that divides the image into regions which are in the range of about 100,000 to 300,000 pixels, the value will be in the 100 to 500 range.

While there is a low probability that areas with a low variation in luminance contain watermark data, there is also a low probability that certain areas which have a high variance in luminance contain watermark data. For example, the area in row c column 6 contains the border between black area 11 and the remainder of the image. In areas such as the area at row c column 6, the variance in luminance would be high due to the edge effect; however, the high variance in luminance in an area such as row c column 6 would not indicate a high probability of finding watermark data. In a region such as row c column 6 the "edginess spread" is low. If a region has a low "edginess spread", the probability of finding watermark data is relatively low.

Thus, after the regions with high luminance variation values are found, those regions are tested to determine "edginess spread". That is, to locate regions where the variance is concentrated along a division between regions each of which have a low variance. Regions where variance in luminance is concentrated along a division between regions each of which have a low variance in luminance are said to have a low edginess spread.

Edginess spread is found by filtering the data with an edge operator such as a Laplacian operator or filter which examines the pixels surrounding each pixel to calculate a New Pixel Intensity value (designated NPI value) and an edginess spread value (ES) according to the following equations:

$$\text{NPI} = \text{Abs Value}\ (4 \times \text{Intensity} - (\text{sum of intensities of pixels above, below, right and left}))$$

where "Abs Value" means "take Absolute value of"

Calculate an NNPI value for each pixel as follows:

$$NNPI = 1 \text{ if } NPI \text{ exceeds a } T1$$

$$= 0 \text{ if } NPI \text{ is less than or equal to } T1$$

$$\text{ES} = (\text{Sum of NNPI for all pixels})/\text{total number of pixels}$$

where T1 is a "threshold" with a value selected to be near the average value of NPI The above calculation gives a second value (ES or edginess spread) for each region. The luminance variance value and the edginess spread value are then combined to give a "probability index" which indicates the probability of finding a watermark in a particular region.

The luminance variance value and the edginess spread value can be combined in a number of ways to obtain a numeric probability index that a region can contain watermark data.

For example the values can be combined as follows:

Probability index=((variance value)/100)+10 (edginess value)

The following is an example of the probability index which results from a number of different values of luminance variation and a number of values of edginess spread calculated as above.

| Variance value | Edginess value | Probability Index |
|---|---|---|
| 300 | 7 | 10 |
| 500 | 2 | 7 |
| 700 | 9 | 16 |

In the above example, the region with the probability index of 16 would be examined first, followed by the region with an index of 10. Regions with an index value of less than 10 would only be examined if the other regions that are examined do not result in the detection of watermark data of sufficient reliability.

It is noted that the equation for combining the values of luminance variation and edginess to obtain the probability index for a region was determined empirically. The equation given above does not take into account the magnitude of the change in luminance across an edge. The following equation for calculating edginess spread takes into account the magnitude of the change in luminance across an edge.

ES=(Sum of NPI for all pixels that exceed $T1$/total number of pixels)

By testing the success obtained with different groups of images of interest which have different characteristics one can determine which equation gives the best results for images with a particular set of characteristics.

It is noted that patent application Ser. No. 09/074,034 filed May 6, 1998 entitled: "Methods and Systems for Watermark Processing of Line Art Images" describes a technique for inserting watermarks into a lined image by varying the width of the lines to indicate watermark data. The present invention would still produce satisfactory results with watermarks of the type described in the above referenced application. The reason is that the line widths in a typical image which uses the technique described in the above application have a width significantly smaller than the size of a pixel in an image from a typical 300 or 600 DPI scanner. The edginess measurement detected by the present invention relates to edges between regions, each of which are wider than a single pixel.

Figure 5:
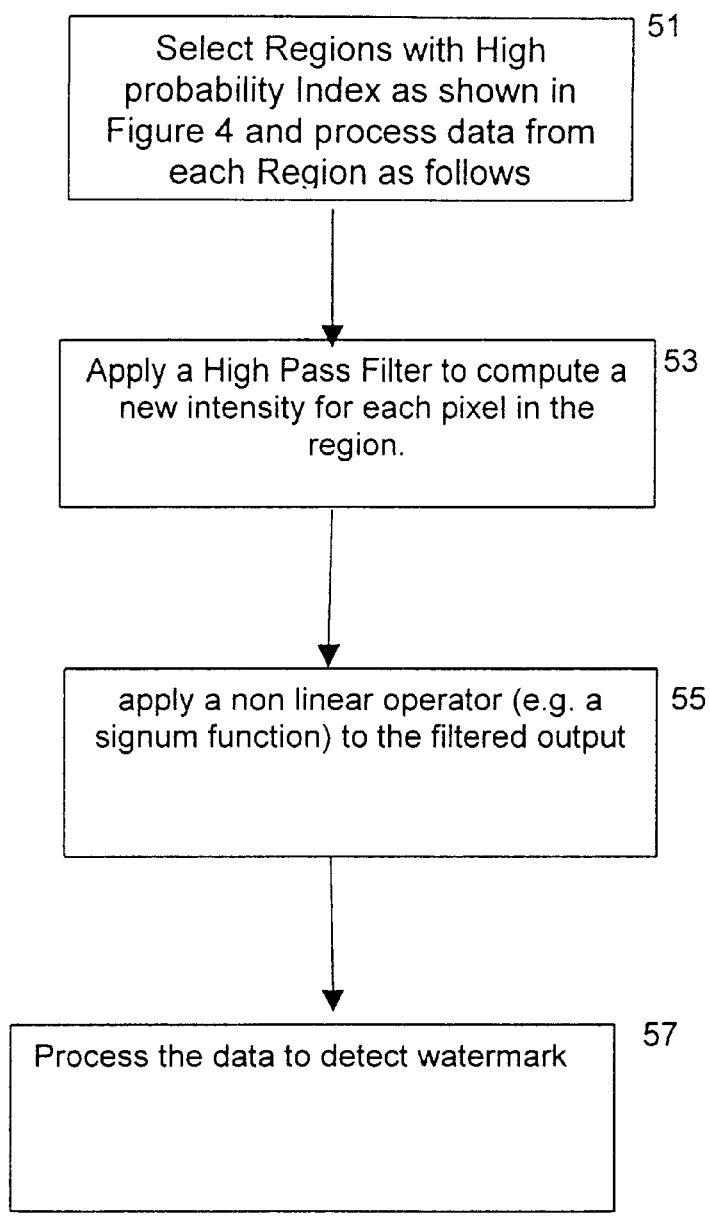
FIG. 5 shows a flow diagram for additional steps that can be used.

The present invention also utilizes additional filtering to enhance the possibility of finding watermark data in the regions selected for further processing by the above described technique. A flow diagram showing how the additional filtering is performed is shown in FIG. 5. The additional steps shown in FIG. 5 facilitate the detection of watermark data in those regions selected for further processing by the steps shown in FIG. 4.

In the process shown in FIG. 5 regions which have a high probability of carrying watermark data are selected for further processing as described above. However with the steps shown in FIG. 5, the regions selected for further processing are filtered prior to the detection step in order to enhance the detection process. The filtering enhances the probability that watermark data will be detected when a region is later processed in a normal or conventional manner to find a watermark. The filtering is done in two steps. First as indicated by block 52, a high pass filter (e.g. a Laplacian operator) is applied to the data. Next as indicated by block 55 a non linear operator (e.g. signum function) is applied to the filtered data. Finally the data is processed in a conventional manner to detect the watermark data.

The first step consists of passing the data from a region through a filter with high pass or edge detection characteristics. For example a Laplacian (or Sobel or Roberts, etc) operator can be applied to each block that was selected for further processing. In the specific embodiment shown here the high pass filter computes a new intensity value at each pixel in the block as follows:

Filtered intensity=Old intensity−average intensity of the 8 neighbors of the pixel The second step consists of applying a nonlinear operator (e.g., a signum operator etc.) to the filtered output of the high pass or edge detection filter. The filtered intensity (FI) of each pixel calculated as given above is modified as follows:

New Intensity = $a$ if $(FI > T1)$

= $b$ if $(T2 <= FI <= T1)$

= $c$ if $(FI < T2)$

Where: a, b, and c are values, and T1 and T2 are thresholds selected to implement a specific nonlinear operator.

In the specific embodiment shown herein a signum function is used to calculate a new intensity for each pixel according to the following equation:

New intensity = 1 if (Filtered intensity > 0)

= 0 if (Filtered intensity = 0)

= −1 if (Filtered intensity < 0)

The high pass filter attenuates the low frequencies and amplifies the contribution from the higher frequencies in each block. The contribution to the low frequencies is mostly from the host image content. Higher frequencies from the watermark signal are amplified. The nonlinear operation in effect whitens the noise caused by the host image content in the frequency domain, increasing the signal-to-noise ratio of the watermark signal.

It is noted as described above, a two dimensional high pass filter is first applied to the data and then the non linear operator is applied to the result. With many types of images better detection can be achieved by applying a one dimensional high pass filter in the horizontal direction, applying the non linear operator to that result, applying a one dimensional high pass filter in the vertical direction, applying the non linear operator to that result, and then summing the two partial results. With other types of images better results can be achieved by applying the one dimensional high pass filters in various other directions.

Since some watermarking programs redundantly embed "pay-load" or watermark data in multiple blocks in an image, in order to further enhance the ability to detect the watermark data from such programs the following technique can be used. Following the non-linear filtering operation, the power spectrum of several blocks can be added together. Due to the redundant embedding, the watermark frequencies repeat through several blocks, the power at those frequencies adds up if the power spectrum of several blocks are added together. The image frequencies from block to block are generally non-repetitive and hence they get averaged out when the power spectrum of several blocks are added together. The power spectrum that results from adding together the power spectrum from several blocks contains a higher signal-to-noise ratio watermark signal. The power spectrum can then be more easily correlated with the power spectrum of the watermark.

Figure 6:
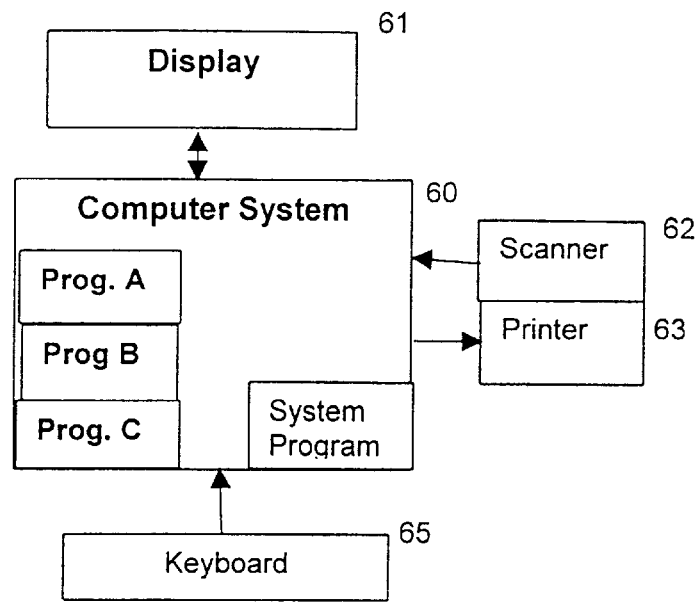
FIG. 6 shows a diagram of a system for practicing the present invention.

A system for practicing the present invention is shown in FIG. 6. The system includes a conventional computer 60 with an associated display 61, an associated document scanner 62 and an associated printer 63. The computer 60, display 61, scanner 62 and printer 63 are conventional components of personal computer systems such as those marketed by vendors such Compact Computer Company, Dell Computer Company, Gateway Computer Corp. etc.

The present invention is practiced under control of programs A, B and C which are stored in computer 60. Program A is a conventional watermark detection program. Program A processes regions of an image to locate watermark data after program B selects the regions of the image which should be processed and program C filters the data from such regions.

Programs which process the pixels in an image to locate watermark data are included in such commercially available programs as the program entitled "Photoshop" which is marketed by Adobe Corporation or the program "Corell DRAW" which is marketed by Corel Corporation, or the program "Micrografx Picture Publisher" which is marketed by Micrografx Corporation. Such programs divide an image into regions and process each region in order to detect the presence of watermark data. With the present invention the same mechanism is used to process the data from each region of an image; however, all the regions of an image are not processed in order.

Program B selects regions of an image which have a high probability of containing watermark data by first selecting which have a high variation in luminance and a high amount of edginess spread as previously described. Program C filters the regions selected for further processing using the two steps process previously described.

In the embodiment of the invention described above, the program 51 (shown in FIG. 5) which selects blocks for further processing merely indicates to the subsequent filtering program which blocks should be processed further. The block selection program could be used to acquire other information about the various blocks in the image. Such additional information could be passed to the filtering programs shown in block 53 and 55 and to the watermark detection program indicated by block 57 to quickly tune these program to the characteristics of the image in particular regions.

It is noted that while the previously described embodiment applies the invention to images. The invention can likewise be applied to video or sound.

While the invention has been shown and described with respect to preferred embodiments thereof, it should be understood that various changes in form and detail may be made without departing from the spirit and scope of the invention. The invention is limited only by the limitations in the appended claims.

We claim:

1. A method for determining the probability of finding a watermark in a region of an image including the steps of:

determining a variance in the luminance of the region, and determining an edginess spread of the region.

2. The method recited in claim 1 where the variance in the luminance of a region is determined by calculating:

$$\text{Variance} = \text{sum}((\text{intensity})^2/\text{number of pixels}) - \text{mean intensity}^2.$$

3. The method recited in claim 1 where the edginess spread of the region is determined by calculating a NPI (New Pixel Intensity) value and edginess spread (ES) value as follows:

$$\text{NPI} = \text{Abs Value}(4 \times \text{Intensity} - (\text{sum of intensities of pixels above, below, right and left})),$$

where "Abs Value" means "take Absolute value of," and $$\text{ES} = (\text{Sum of NPI for all pixels that exceed a threshold})/\text{total number of pixels.}$$

4. The method recited in claim 1 where the edginess spread of the region is determined by calculating a NPI (New Pixel Intensity) value and edginess spread (ES) value as follows:

$$\text{NPI} = \text{Abs Value}(4 \times \text{Intensity} - (\text{sum of intensities of pixels above, below, right and left})),$$

where "Abs Value" means "take Absolute value of;"
Calculate an NNPI value for each pixel as follows:

$$NNPI = 1 \text{ if } NPI \text{ exceeds a } T1, \text{ and}$$

$$= 0 \text{ if } NPI \text{ is less than or equal to } T1; \text{ and}$$

$$\text{ES} = (\text{Sum of NNPI for all pixels})/\text{total number of pixels,}$$

where T1 is a "threshold" with a value selected to be near the average value of NPI.

5. A system for determining the probability of finding a watermark in a region of an image including:

means for determining a variance in the luminance of the region, and means for determining an edginess spread of the region.

6. The system recited in claim 5 where the variance in the luminance of a region is determined by means for calculating:

$$\text{Variance} = \text{sum}((\text{intensity})^2/\text{number of pixels}) - \text{mean intensity}^2.$$

7. The system recited in claim 5 where the edginess spread of the region is determined by means for calculating a new pixel intensity value NPI) and an edginess spread (ES) value as follows:

$$\text{NPI} = \text{Abs Value}(4 \times \text{Intensity} - (\text{sum of intensities of pixels above, below, right and left})),$$

where "Abs Value" means "take the Absolute value of," and $$\text{ES} = (\text{Sum of NPI for all pixels that exceed a threshold})/\text{total number of pixels.}$$

8. The system recited in claim 5 where the edginess of the region is determined by means for calculating new pixel intensity value (NPI) and an edginess spread (ES) value as follows:

NPI=Abs Value(4×Intensity−(sum of intensities of pixels above, below, right and left)), where "Abs Value" means "take Absolute value of;"
Calculate an NNPI value for each pixel as follows:

NNPI = 1 if NPI exceeds a T1, and

= 0 if NPI is less than or equal to T1; and

ES=(Sum of NNPI for all pixels)/total number of pixels, where T1 is a "threshold" with a value selected to be near the average value of NPI.

9. A method of detecting digital watermarks in an image by:
first, determining the probability that watermark data is located in various regions of the image, and second, processing the regions of the image with the highest probability before processing regions with low probability in order to locate watermark data, wherein the step of determining the probability that watermark data is located in various regions of the image is performed by first calculating the variance in the luminance of the pixels in the region and by determining the edginess spread of regions which have a high variation in luminance.

10. A system for detecting digital watermarks in an image including means for determining the probability that watermark data is located in various regions of the image, and means for processing the regions of the image with the highest probability before processing regions with lower probability in order to locate watermark data, wherein the means for determining the probability that watermark data is located in various regions of the image includes means for calculating e variance in the luminance of the pixels in the region and means For determining the edginess spread of regions which have a high variation in luminance.

11. A method of detecting watermark data in an image which can be divided into blocks of pixels, comprising the steps of;
detecting blocks which have a high probability of containing watermark data to select a high probability group of blocks, and
filtering the high probability group of blocks which have a high probability of containing watermark data using a process comprising:
first computing a new intensity value for each pixel in each high probability block using a high pass filter, and next
computing a second new intensity value by applying a non-linear function to the new intensity value.

12. The method recited in claim 11 wherein the first computing a new intensity value step computes the new intensity value using the following equation:

New intensity=Old intensity−average intensity of the 8 neighbors of the pixel.

13. The method recited in claim 11 wherein the second new intensity value is calculated as follows:

Second New intensity= 1 if (Filtered intensity > 0);

= 0 if (Filtered intensity = 0); and

= −1 if (Filtered intensity < 0).

14. A system for detecting watermark data in an image which call be divided into blocks of pixels, comprising the steps of:
means for detecting blocks which have a high probability of containing watermark data to select a high probability group of blocks, and
means for filtering the high probability group of blocks which have a high probability of containing watermark data, said filtering means comprising:
means for first computing a new intensity value for each pixel in each high probability block using a Laplacian operator, and
means for computing a second new intensity value by applying a signum function to the new intensity value.

15. The system recited in claim 14 wherein the Laplacian operator computes the new intensity value using the following equation:

New intensity=Old intensity−average intensity of the 8 neighbors of the pixel.

16. The system recited in claim 14 wherein the second new intensity value is calculated as follows:

Second New intensity= 1 if (Filtered intensity > 0);

= 0 if (Filtered intensity = 0); and

= −1 if (Filtered intensity < 0).

17. A method of detecting watermark data in a group of pixels including the steps of:
first computing a new intensity value (NIV) for each pixel in the group of pixels using a high pass filter, and next
computing a second new intensity value by applying a non linear operator to the NIV values, the second new intensity values collectively comprising a set, and
processing the set of second new intensity values to detect a watermark.

18. The method recited in claim 17 wherein the high pass filter computes the new intensity value using the following equation:

NIV=Old intensity−average intensity of the 8 neighbors of the pixel.

19. The method recited in claim 17 wherein the second new intensity value is calculated as follows:

Second New intensity= 1 if (Filtered intensity > 0);

= 0 if (Filtered intensity = 0); and

= −1 if (Filtered intensity < 0).

20. The method recited in claim 17 wherein the second new intensity value (SNI) is calculated by a non-linear operator as follows:

$$SNI = a \text{ if } (NIV > T1);$$
$$= b \text{ if } (T2 <= NIV <= T1); \text{ and}$$
$$= c \text{ if } (NIV < T2),$$

where: a, b, and c are selected values, and T1 and T2 are thresholds.

* * * * *